US012798252B2

(12) United States Patent
Tanaka et al.

(10) Patent No.: US 12,798,252 B2
(45) Date of Patent: Nov. 17, 2026

(54) LIQUID DISCHARGE APPARATUS

(71) Applicant: CANON KABUSHIKI KAISHA, Tokyo (JP)

(72) Inventors: Yusuke Tanaka, Kanagawa (JP); Koki Shimada, Kanagawa (JP); Fumie Kameyama, Tokyo (JP); Tetsu Hamano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 198 days.

(21) Appl. No.: 18/752,608

(22) Filed: Jun. 24, 2024

(65) Prior Publication Data

US 2025/0001760 A1 Jan. 2, 2025

(30) Foreign Application Priority Data

Jun. 27, 2023 (JP) ................................ 2023-105355

(51) Int. Cl.
*B41J 2/17* (2006.01)
*B41J 2/165* (2006.01)

(52) U.S. Cl.
CPC ......... *B41J 2/1721* (2013.01); *B41J 2/16505* (2013.01)

(58) Field of Classification Search
CPC .. B41J 2/1721; B41J 2/16505; B41J 2/17509; B41J 2/17513
See application file for complete search history.

(56) References Cited

U.S. PATENT DOCUMENTS

| | | | | |
|---|---|---|---|---|
| 5,386,222 A * | 1/1995 | Iwata | B41J 2/16523 347/89 |
| 2022/0258473 A1* | 8/2022 | Nitobe | B41J 2/16523 |
| 2024/0042767 A1* | 2/2024 | Kosaka | B41J 2/1721 |

FOREIGN PATENT DOCUMENTS

| | | | | |
|---|---|---|---|---|
| JP | 4848699 B2 * | 12/2011 | B41J 29/17 |
| JP | 2016043557 A * | 4/2016 | B41J 2/16523 |
| JP | 2021109415 A | 8/2021 | |
| JP | 2023172279 A | 12/2023 | |
| KR | 20220125487 A * | 9/2022 | B41J 2/17533 |

OTHER PUBLICATIONS

English Translation of KR-2022-0125487 (Year: 2022).*

* cited by examiner

*Primary Examiner* — Sharon Polk
(74) *Attorney, Agent, or Firm* — Canon U.S.A., Inc. IP Division

(57) ABSTRACT

A liquid discharge apparatus includes a suction unit configured to suction liquid from a discharge head configured to discharge liquid, and a tank that includes an introduction portion into which liquid suctioned by the suction unit is introduced, and is detachable from the liquid discharge apparatus, wherein the tank includes a retaining portion configured to retain liquid that has dripped from the introduction portion.

15 Claims, 11 Drawing Sheets

LIQUID DISCHARGE APPARATUS

BACKGROUND

Field

The present disclosure generally relates to a liquid discharge apparatus.

Description of the Related Art

In inkjet recording apparatuses, a recovery operation is performed on a recording head to recover discharge performance. When the recovery operation is performed, waste ink that is not used in recording is generated. Thus, among the inkjet recording apparatuses, some are designed to include a replaceable waste ink tank to store the waste ink.

Japanese Patent Application Laid-Open No. 2021-109415 discusses a configuration including an attachment unit to which a waste liquid container is attachable and a shielding unit that shields a waste ink ejection unit arranged in the attachment unit. Such a configuration is expected to provide an advantage of reducing adhesion of ink from the ejection unit when the waste liquid container is removed.

In the configuration discussed in Japanese Patent Application Laid-Open No. 2021-109415, however, waste ink that has adhered to an opening of the waste liquid container may drip downward.

SUMMARY

According to some embodiments, a liquid discharge apparatus includes a suction unit configured to suction liquid from a discharge head configured to discharge liquid, and a tank that includes an introduction portion into which liquid suctioned by the suction unit is introduced, and is detachable from the liquid discharge apparatus, wherein the tank includes a retaining portion configured to retain liquid that has dripped from the introduction portion.

Further features of the present disclosure will become apparent from the following description of exemplary embodiments with reference to the attached drawings.

DESCRIPTION OF THE EMBODIMENTS

Various exemplary embodiments, features, and aspects of the present disclosure are to be described with reference to the drawings. It is to be understood that the descriptions of the exemplary embodiments below are not intended to limit the disclosure, and that not all of combinations of aspects that are described in the following embodiments are necessarily required with respect to an issue to be solved by the present disclosure. Relative arrangements and shapes of components described in the exemplary embodiments are illustrative only, and the descriptions of the exemplary embodiments are not intended to limit the scope of the present disclosure.

The term "record" used in the present disclosure represents not only a case where meaningful information such as text and a graphic is formed, but also a case where an image, a design, or a pattern is formed across a recording medium regardless of whether the image, design, or pattern is meaningful information or meaningless information, or the medium is processed. The resultant of the recording is not concerned whether it has become visually perceived by human. In the present disclosure, paper serves as "a recording medium". However, the recording medium may be a medium such as cloth and a plastic film.

The term "ink" (may also be referred to as "liquid") used in the present disclosure should be broadly interpreted as similar to the definition of "record" mentioned above. The term "ink" represents liquid that is added to a recording medium, so that an image, a design, or a pattern is formed, or the recording medium is processed. The term "ink" also represents liquid that is provided in an ink process (e.g., coagulation or insolubilization of a coloring material in ink to be added to a recording medium).

Figure 1:
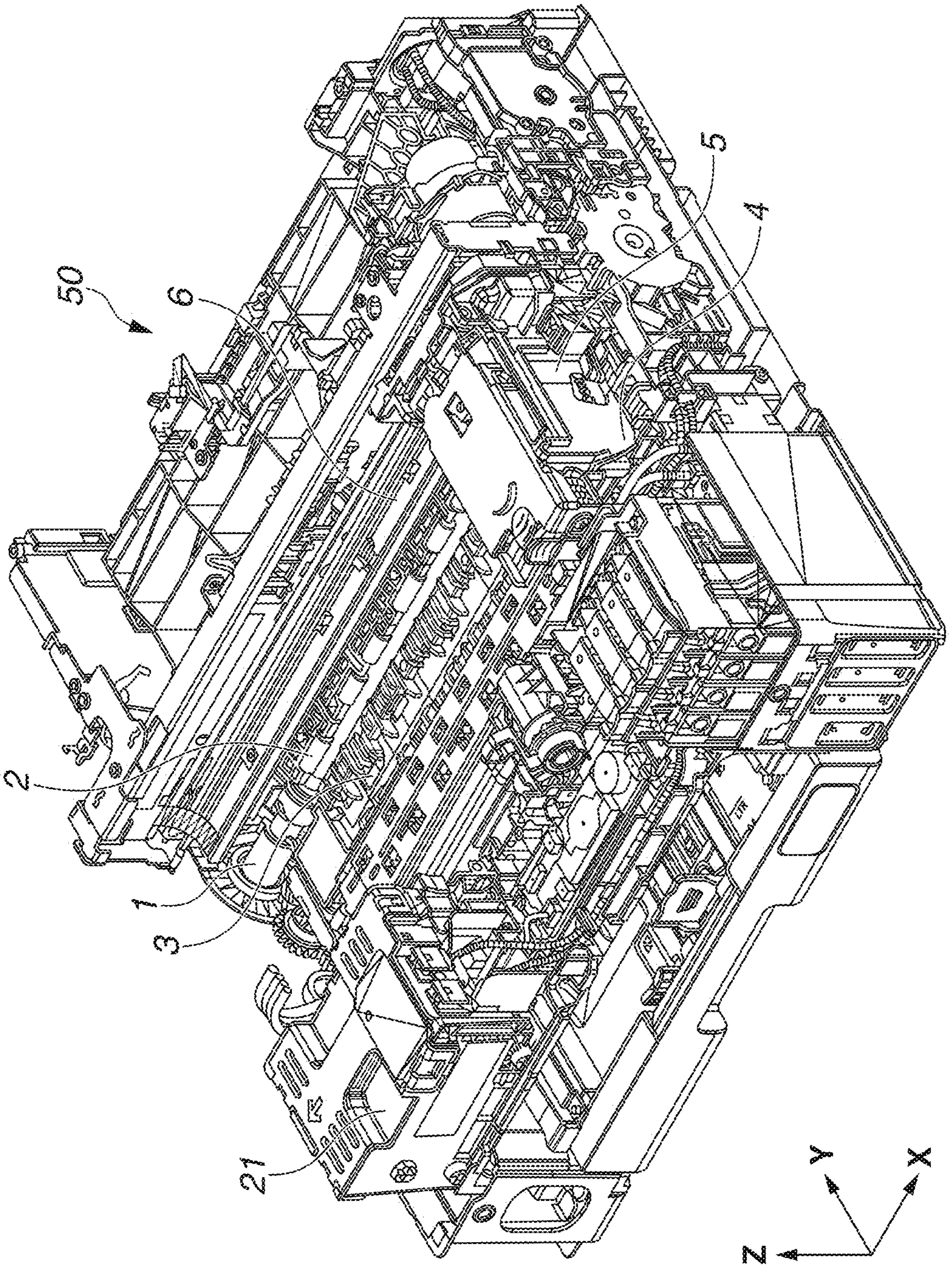
FIG. 1 is a perspective view illustrating a recording apparatus according to a first exemplary embodiment.

A first exemplary embodiment is to be described. FIG. 1 is a perspective view illustrating an inkjet recording apparatus 50 (hereinafter called a recording apparatus 50) as a liquid discharge apparatus according to the present exemplary embodiment. The recording apparatus 50 includes a feed roller (not illustrated) that feeds a sheet member (not illustrated) as a recording medium, a conveyance roller 1 that conveys the sheet member, and a pinch roller 2 that is rotated with the rotation of the conveyance roller 1. The sheet member is conveyed to a platen 3 in a state in which the sheet member is nipped by the conveyance roller 1 and the pinch roller 2. The sheet member supported by the platen 3 is ejected out of the recording apparatus 50 by an ejection roller (not illustrated) after an image is recorded by a recording head (a discharge head) 4 that discharges ink.

Figure 2:
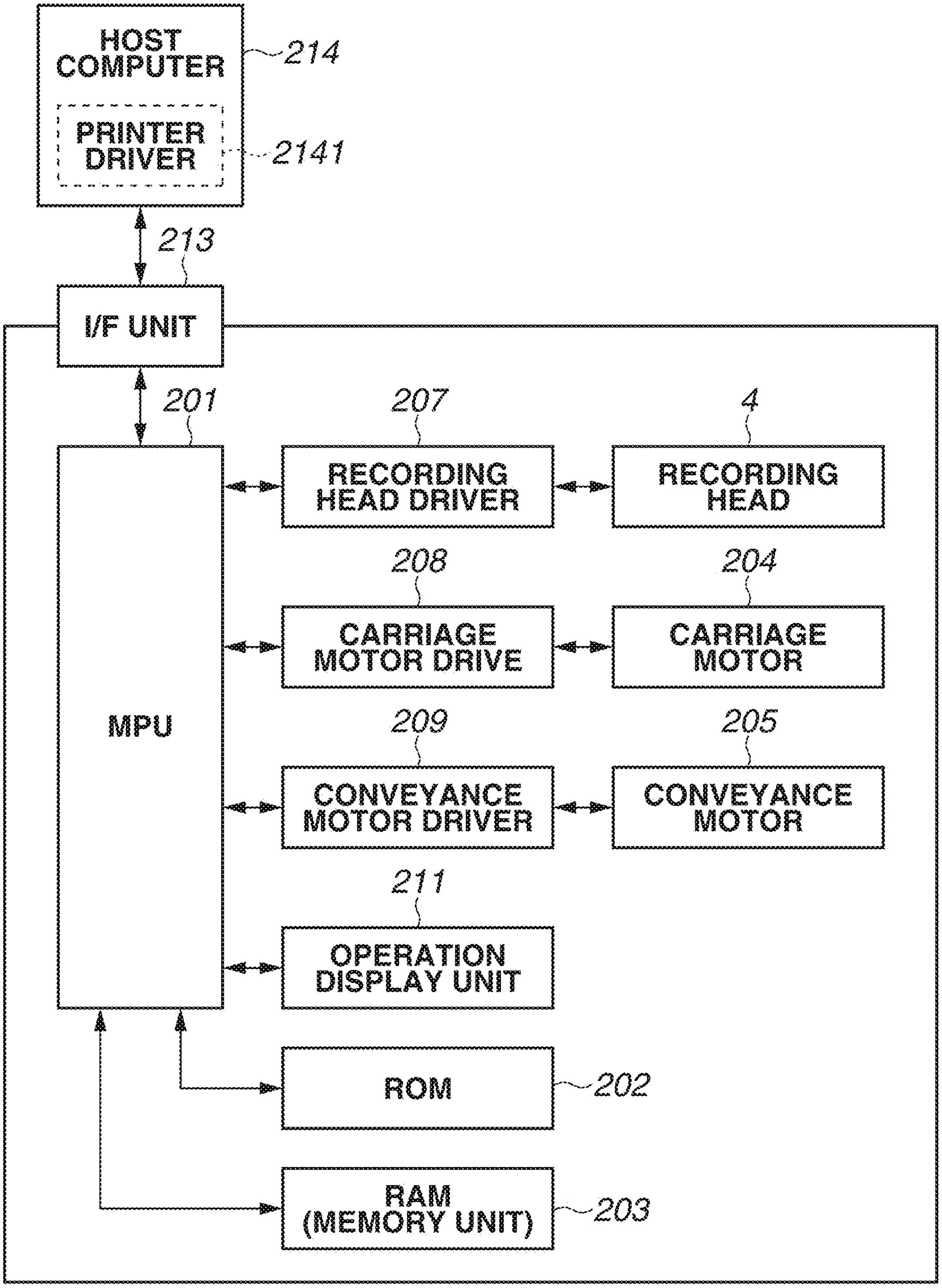
FIG. 2 is a block diagram illustrating a control system of the recording apparatus according to the first exemplary embodiment.

The recording head 4 is mounted on a carriage 5, and is reciprocally movable in an X direction along a guide rail 6 by a carriage motor 204 (not illustrated in FIG. 1, see FIG. 2).

When recording is performed on a recording medium, the recording head 4 discharges ink while moving in the X direction with the carriage 5 to record an image of one line having a predetermined length in a Y direction. Then, the recording medium is conveyed for a predetermined amount by the conveyance roller 1 and the pinch roller 2, and the recording head 4 again records an image of one line on the recording medium. The recording apparatus 50 repeatedly performs a recording operation for one line by the recording head 4 and a recording medium conveyance operation by the conveyance roller 1 and the pinch roller 20, so that recording on the recording medium is completed.

The X direction and the Y direction represent a horizontal direction in which the X and Y directions intersect with each other (the X and Y directions orthogonal to each other in the present exemplary embodiment). Moreover, a Z direction is a direction intersecting with any of the X and Y directions (a direction orthogonal to any of the X and Y directions in the present exemplary embodiment), and corresponds to the direction of the gravity.

FIG. 2 is a block diagram illustrating a control system of the recording apparatus 50. A micro processing unit (MPU) 201, which may include one or more processers, circuitry, or combinations thereof, can comprehensively control the recording apparatus 50. For example, the MPU 201 controls an operation of each unit and data processing. A read only memory (ROM) 202 stores various data and a program to be executed by the MPU 201. A random access memory (RAM) 203 temporarily stores processing data to be executed by the MPU 201 and data received from a host computer 214.

A recording head driver 207 controls the recording head 4. A carriage motor driver 208 controls the carriage motor 204 that drives the carriage 5. A conveyance motor 205 drives the conveyance roller 1 and the ejection roller. A conveyance motor driver 209 controls the conveyance motor 205. The host computer 214 includes a printer driver 2141. When a user instructs execution of a recording operation, the printer driver 2141 coordinates recording information such as a recording image and recording image quality, and communicates with the recording apparatus 50.

The MPU 201 exchanges the recording information such as a recording image with the host computer 214 via an interface (I/F) unit 213.

Figure 3:
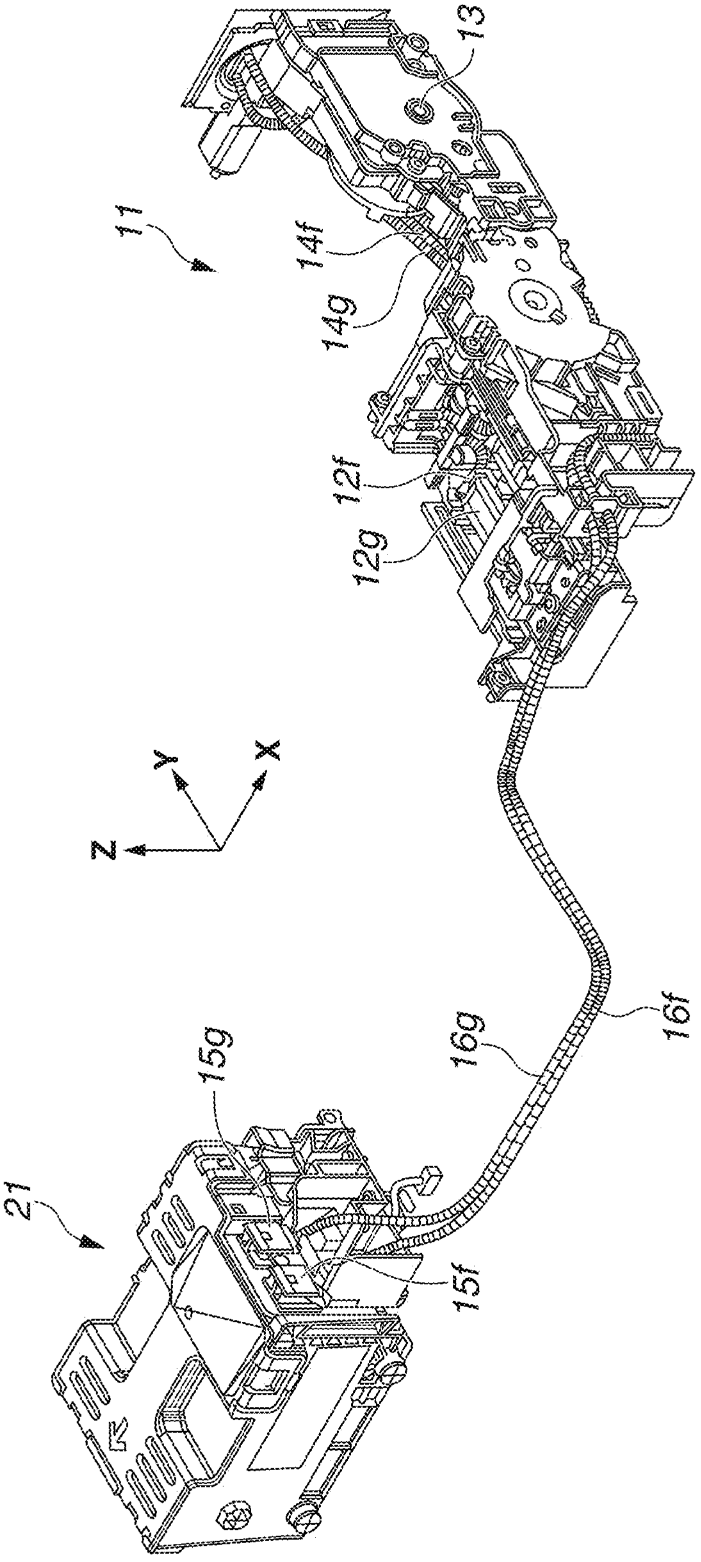
FIG. 3 is a perspective view illustrating a recovery unit according to the first exemplary embodiment.

FIG. 3 is a perspective view illustrating a recovery unit 11 of the recording apparatus 50. The recovery unit 11 includes a cap 12, a suction pump 13, suction tube 14, a waste ink tank 21, an ejection unit 15, and an ejection tube 16. The recording head 4 of the present exemplary embodiment can discharge inks of four colors, which are black ink, cyan ink, magenta ink, and yellow ink. In the present exemplary embodiment, the black ink contains pigment ink, whereas the cyan ink, the magenta ink, and the yellow ink (hereinafter collectively called color ink) contains dye ink.

The recording head 4 has a discharge port surface on which a discharge port that discharges ink is arranged. A cap 12*f* covers a discharge port that discharges black ink, whereas a cap 12*g* covers a discharge port that discharges color ink. In a case where pigment ink and dye ink are mixed, the ink solidifies. Accordingly, in the present exemplary embodiment, the caps 12*f* and 12*g* (collectively called a cap or caps 12) are separately arranged for black ink and color ink. Suh arrangement prevents ink from being mixed in the cap.

The cap 12 and the suction pump 13 are connected by the suction tube 14. When the suction pump 13 is driven, the ink inside the cap 12 is suctioned. In the present exemplary embodiment, a suction tube 14*f* and a suction tube 14*g* are arranged. The suction tube 14*f* connects the cap 12*f* to the suction pump 13 to suction black ink, whereas the suction tube 14*g* connects the cap 12*g* to the suction pump 13 to suction color ink.

The ink (the waste ink) suctioned by the suction pump 13 is ejected to the waste ink tank 21 via the ejection tube 16. The ejection tube 16 connects the suction pump 13 to the ejection unit 15 of the waste ink tank 21. In the present exemplary embodiment, an ejection tube 16*f* and an ejection tube 16*g* are arranged. The ejection tube 16*f* connects the suction pump 13 to a black ink ejection portion 15*f*, whereas the ejection tube 16*g* connects the suction pump 13 to a color ink ejection portion 15*g*.

Figure 4:
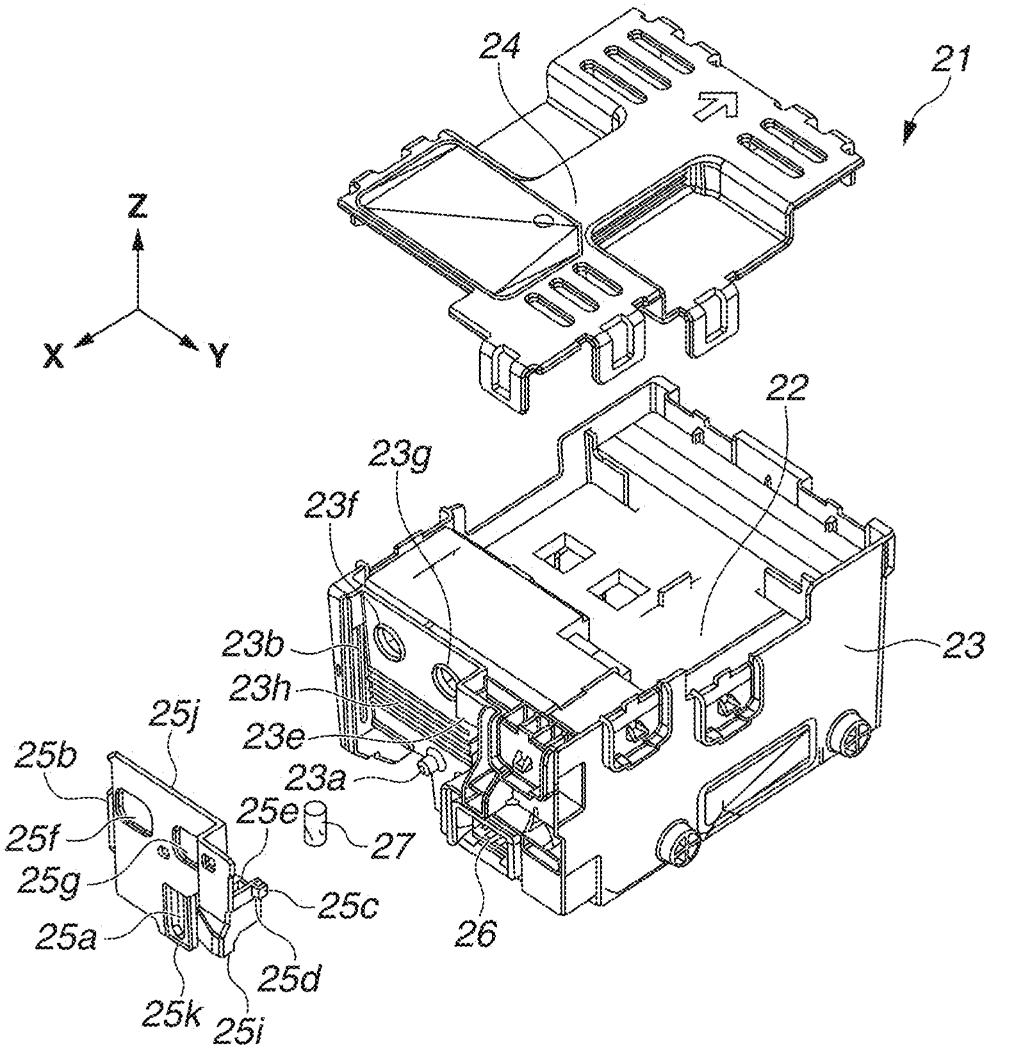
FIG. 4 is an exploded perspective view illustrating a waste ink tank according to the first exemplary embodiment.
Figure 5A:
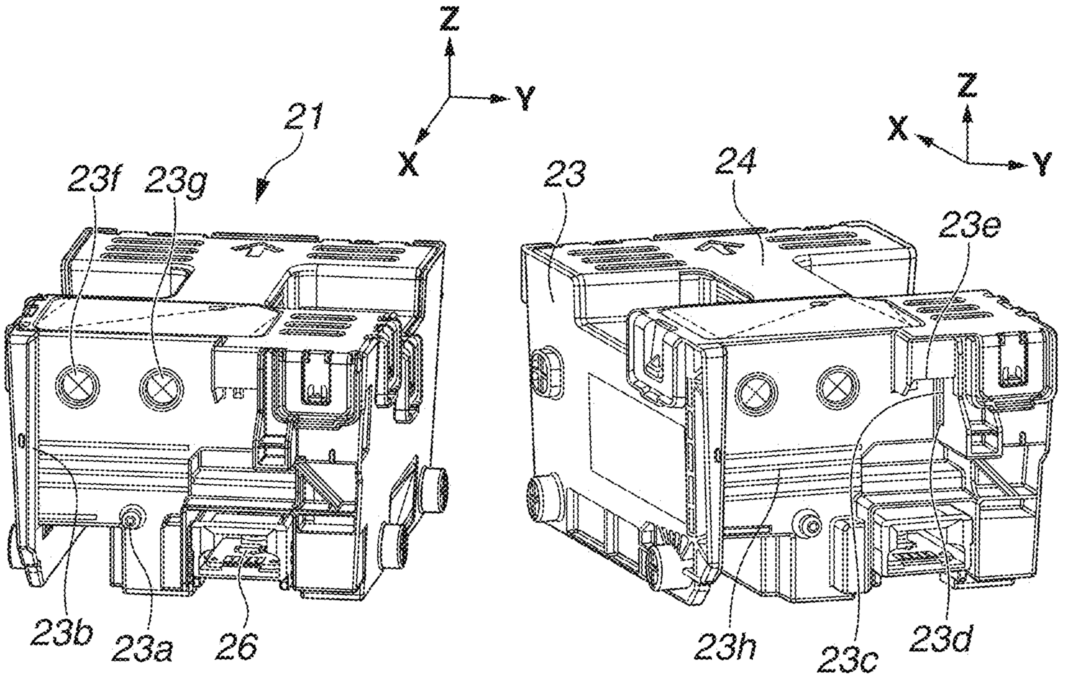
FIGS. 5A and 5B are perspective views respectively illustrating the waste ink tank and a shielding unit according to the first exemplary embodiment.
Figure 5B:
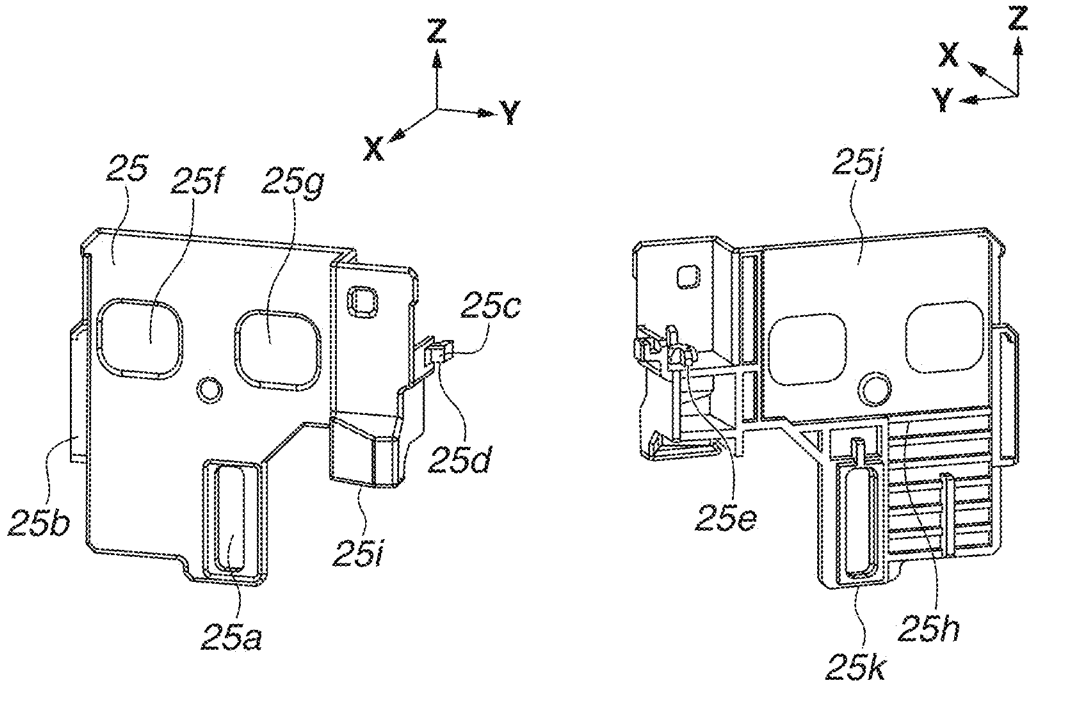

FIG. 4 is an exploded perspective view illustrating the waste ink tank 21. FIG. 5A is a perspective view illustrating the waste ink tank 21, and FIG. 5B is a perspective view illustrating a shielding unit 25 of the waste ink tank 21. The waste ink tank 21 includes an absorber 22, a container 23 in the shape of a box, and a cover 24. The absorber 22 can absorb waste ink. The container 23 has a top portion that is opened to accommodate the absorber 22 inside. The cover 24 is arranged to cover the opening of the container 23. The container 23 includes a black-ink introduction portion 23*f* for introducing black ink from the ejection portion 15*f* to the container 23, and a color-ink introduction portion 23*g* for introducing color ink from the ejection portion 15*g* to the container 23.

The waste ink suctioned by the suction pump 13 is introduced into the waste ink tank 21 from the ejection portions 15*f* and 15*g* via the introduction portions 23*f* and 23*g*, respectively, and is then absorbed and retained by the absorber 22. If a counter value of the control unit (the MPU 201) of the recording apparatus 50 exceeds a predetermined amount, the MPU 201 prompts a user to replace the waste ink tank 21 via an operation display unit 211.

The user removes the waste ink tank 21 in which the predetermined amount of the waste ink is retained from the recording apparatus 50, and attaches a new waste ink tank 21 in replacement. When a connection terminal 26 arranged in the waste ink tank 21 and a connection terminal (not illustrated) arranged in the recording apparatus 50 are electrically connected, the MPU 201 detects attachment of the waste ink tank 21 and updates a counter value. Accordingly, the waste ink tank 21 is detachable from the recording apparatus 50.

The container 23 includes a first regulation portion 23*a*, a second regulation portion 23*b*, a third regulation portion 23*c*, a contact portion 23*d*, a spring holder 23*e*, rib portions 23*h*, and the shielding unit 25, in addition to the introduction portions 23*f* and 23*g*. The rib portion 23*h* is arranged at a position below the introduction portions 23*f* and 23*g* (in a −Z direction), and is a raised rib protruding from a surface on which the introduction portions 23*f* and 23*g* are arranged. The rib portion 23*h* is formed so as to extend in a Y direction.

The shielding unit 25 includes a first regulation portion 25*a*, a second regulation portion 25*b*, a third regulation portion 25*c*, a contact portion 25*d*, a spring holder 25*e*, openings 25*f* and 25*g*, and rib portions 25*h*. The rib portion 25*h* is arranged at a position below the openings 25*f* and 25*g* (in a −Z direction), and is a raised rib protruding from a surface on which the openings 25*f* and 25*g* are formed. The rib portion 25*h* is formed so as to extend in a Y direction. The rib portion 25*h* is arranged on a surface opposite the container 23 in a state in which the shielding unit 25 is attached to the container 23. That is, the rib portions 23*h* and the rib portions 25*h* are arranged to be opposite each other in a state in which the shielding unit 25 is attached to the container 23.

The shielding unit 25 and a compression spring 27 are attached to the container 23. The top of the compression spring 27 (an end portion of the compression spring 27 in a +Z direction) comes into contact with the spring holder 23*e* of the container 23, and the bottom of the compression spring 27 (an end portion of the compression spring 27 in a −Z direction) comes into contact with the spring holder 25*e* of the shielding unit 25. The first regulation portion 23*a* of the container 23 is engaged with the first regulation portion 25*a* of the shielding unit 25. Accordingly, a position of the shielding unit 25 in a Y direction is regulated and set relative to the container 23.

The second regulation portion 23*b* of the container 23 is engaged with the second regulation portion 25*b* of the shielding unit 25, and the third regulation portion 23*c* of the container 23 is engaged with the third regulation portion 25*c* of the shielding unit 25. Accordingly, a position of the shielding unit 25 in an X direction is regulated and set relative to the container 23. Thus, the shielding unit 25 is movably attached in a Z direction relative to the container 23.

The contact portion 25*d* of the shielding unit 25 comes into contact with the contact portion 23*d* of the container 23, so that a position of the shielding unit 25 in a −Z direction is regulated. The shielding unit 25 is urged in the −Z direction relative to the container 23 by a pressing force of the compression spring 27. That is, in a state in which the waste ink tank 21 is removed, the contact portion 25*d* of the shielding unit 25 is in contact with the contact portion 23*d* of the container 23. The connection terminal 26 on the container 23 is arranged at a position displaced (in a different position) from a lower end portion 25*k* of the shielding unit 25 in a Y direction.

Figure 6:
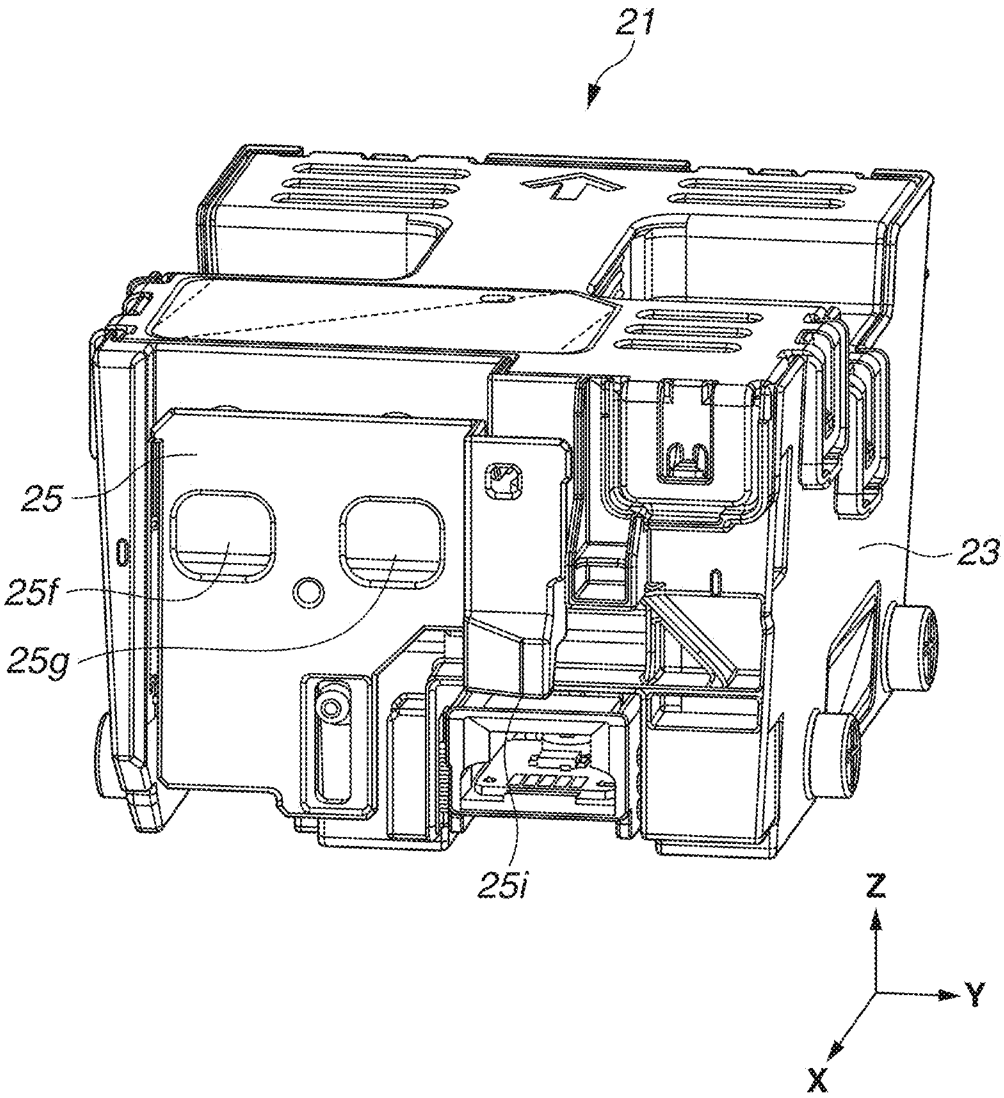
FIG. 6 is a perspective view illustrating details of the waste ink tank according to the first exemplary embodiment.
Figure 7:
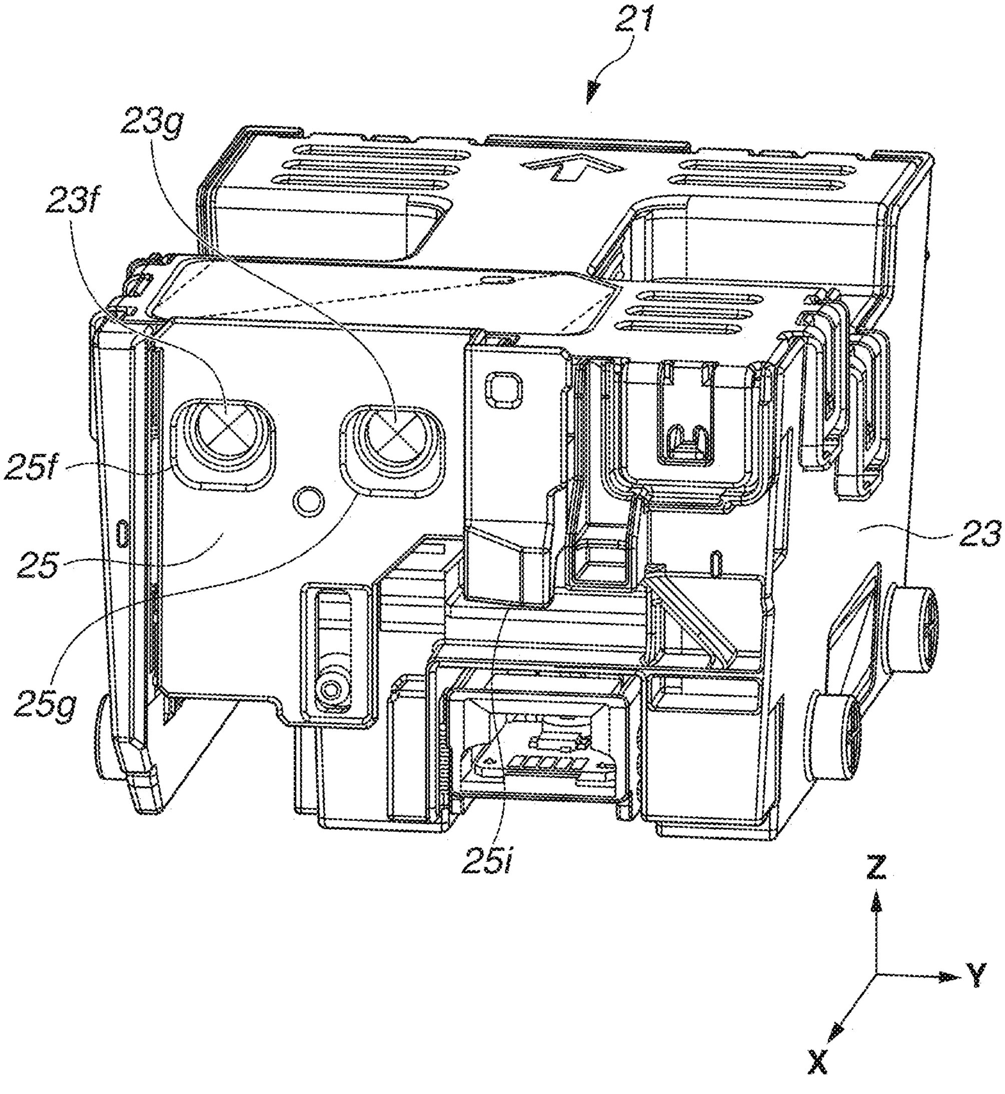
FIG. 7 is a perspective view illustrating details of the waste ink tank according to the first exemplary embodiment.

FIGS. 6 and 7 are perspective views each illustrating details of the waste ink tank 21. FIG. 6 illustrates a state in which the shielding unit 25 is moved downward (in a −Z direction), and the introduction portions 23*f* and 23*g* are shielded by the shielding unit 25. FIG. 7 illustrates a state in which the shielding unit 25 is moved upward (in a +Z direction), and the introduction portions 23*f* and 23*g* are not shielded. In a state in which the waste ink tank 21 is removed from the recording apparatus 50, the introduction portions 23*f* and 23*g* are not exposed from the respective openings 25*f* and 25*g*, and are shielded by the shielding unit 25 as illustrated in FIG. 6. Herein, a contact portion 25*i* arranged on the shielding unit 25 is in contact with the container 23.

The attachment of the waste ink tank 21 to the recording apparatus 50 moves the shielding unit 25 upward (in a +Z direction). Accordingly, the introduction portions 23*f* and 23*g* are exposed from the openings 25*f* and 25*g*, respectively, and thus are not shielded by the shielding unit 25 as illustrated in FIG. 7. Herein, the contact portion 25*i* arranged on the shielding unit 25 does not contact the container 23, and is separated from the container 23.

Figure 8:
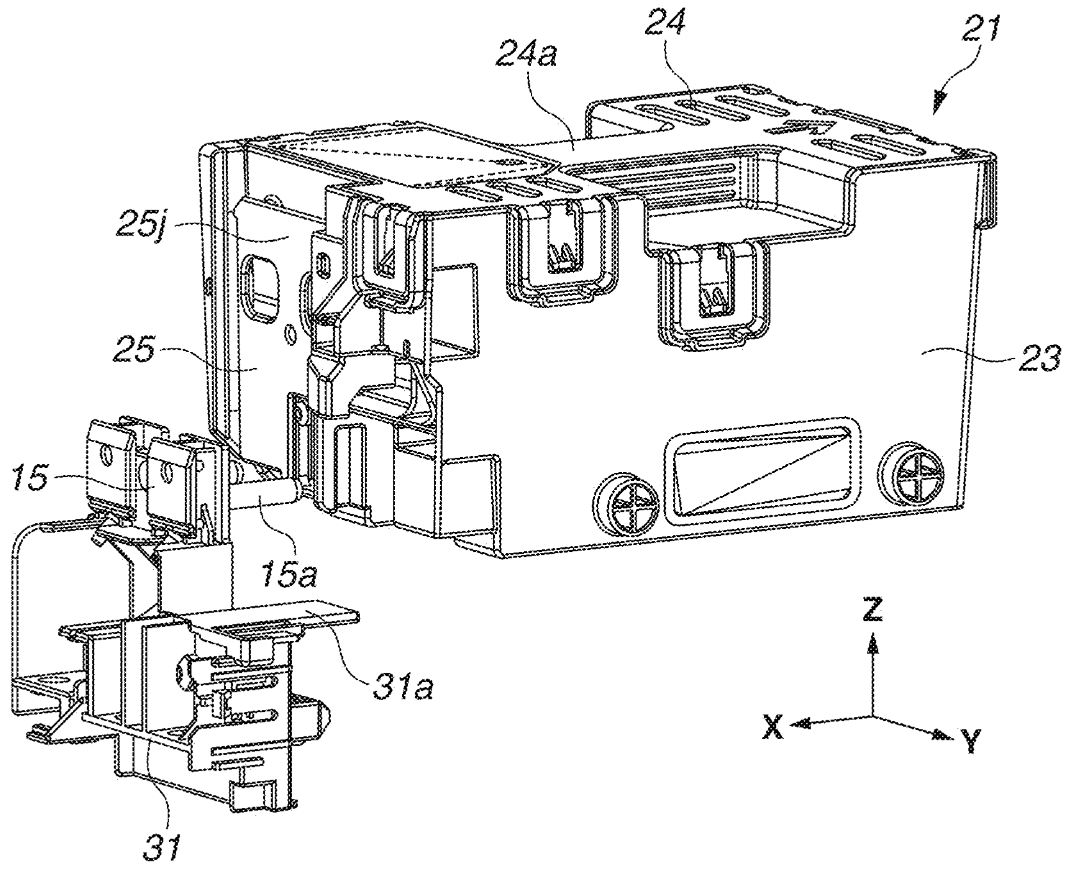
FIG. 8 is a conceptual perspective view illustrating a state in which the waste ink tank is separated from the recording apparatus according to the first exemplary embodiment.
Figure 9:
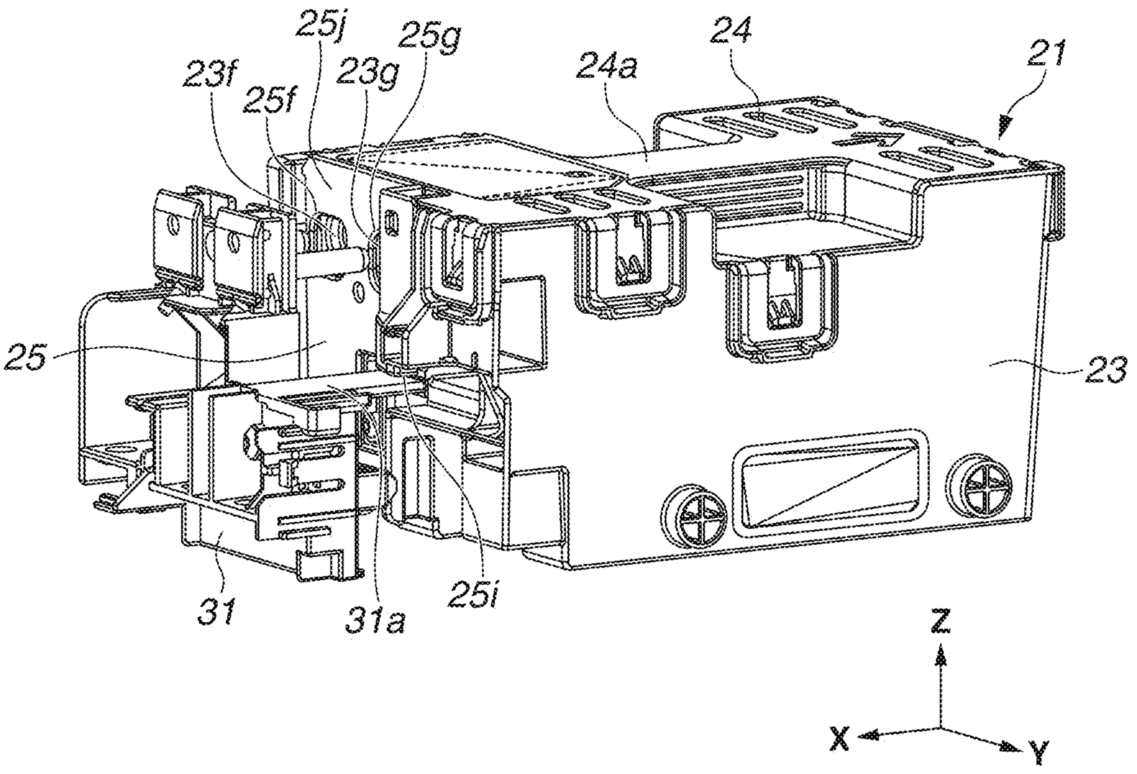
FIG. 9 is a conceptual perspective view illustrating a state in which the waste ink tank is placed on a base unit according to the first exemplary embodiment.
Figure 10:
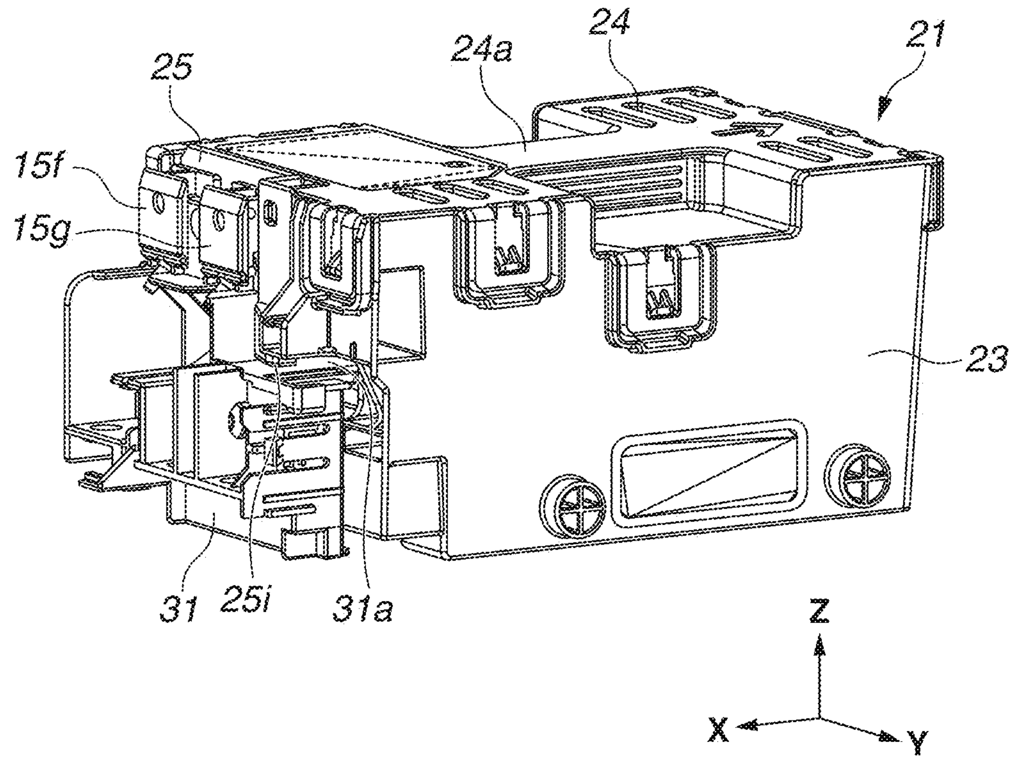
FIG. 10 is a conceptual perspective view illustrating a state in which the waste ink tank is attached to the recording apparatus according to the first exemplary embodiment.

Attachment of the waste ink tank 21 to the recording apparatus 50 is to be described with reference to FIGS. 8 through 10. Each of FIGS. 8 through 10 is a conceptual perspective view of the waste ink tank 21 as seen from a rear side of the recording apparatus 50. FIG. 8 illustrates a state in which the waste ink tank 21 is separated (removed) from a base unit 31 disposed in a main body of the recording apparatus 50. Since the shielding unit 25 is urged downward (in a −Z direction) by a pressing force of the compression spring 27 as described above, the introduction portions 23*f* and 23*g* are covered with a shielding surface 25*j* of the shielding unit 25.

FIG. 9 illustrates a state in which the waste ink tank 21 is placed on the base unit 31. Herein, a contact portion 31*a* of the base unit 31 is in contact with the contact portion 25*i* of the shielding unit 25. Because a weight by mass of the waste ink tank 21 is greater than a pressing force of the compression spring 27, the shielding unit 25 moves upward (in a +Z direction) relative to the container 23 against the urge of the compression spring 27. The upward movement of the shielding unit 25 causes the introduction portions 23*f* and 23*g* to be exposed from the openings 25*f* and 25*g*.

FIG. 10 illustrates a state in which the waste ink tank 21 is attached to the recording apparatus 50. When the waste ink tank 21 is moved in a +X direction from the state illustrated in FIG. 9, the ejection portions 15*f* and 15*g* supported by the base unit 31 are respectively inserted into the introduction portions 23*f* and 23*g*. Herein, the connection terminal 26 of the waste ink tank 21 and the connection terminal (not illustrated) arranged in the recording apparatus 50 are electrically connected, and the MPU 201 detects an attachment state and updates a counter value.

When a user removes the waste ink tank 21 from the recording apparatus 50, the state is shifted in order of FIGS. 10, 9, and 8. In the state illustrated in FIG. 10, the user holds a handle portion 24*a* and moves the waste ink tank 21 in a −X direction, so that the state is shifted to the state illustrated in FIG. 9.

For example, in a case where the waste ink tank 21 is removed during a suction operation that is performed by the suction pump 13, the suction operation is stopped based on detection by the connection terminal 26. However, there is a time lag between issuance of a stop instruction by the MPU 201 and the actual stop of the suction operation. In such a situation, the waste ink to be ejected from the ejection portions 15*f* and 15*g* may adhere to the introduction portions 23*f* and 23*g* at the time when the ejection portions 15*f* and 15*g* are respectively removed from the introduction portions 23*f* and 23*g*.

The waste ink which has adhered to the introduction portions 23*f* and 23*g* drips downward (in a −Z direction) by gravity. However, in the present exemplary embodiment, the rib portions 23*h* are arranged in the container 23, and the rib portions 25*h* are arranged in the shielding unit 25. Thus, when the waste toner reaches the rib portions 23*h* and 25*h*, the downward movement of the waste ink (in the −Z direction) is stemmed by the rib portions 23*h* and 25*h*, and the waste ink is retained up to a predetermined amount. For this reason, the periphery of the waste ink tank 21 is prevented from being soiled with the waste ink which has dripped from the waste ink tank 21.

Assuming a case in which ink the amount of which cannot be retained by the rib portions 23*h* and 25*h* drips. In such a case, the waste ink moves in a −Z direction (downward) along the shape of the shielding unit 25, and reaches the lower end portion 25*k*. In the present exemplary embodiment, since the lower end portion 25*k* and the connection terminal 26 are arranged at positions displaced from one another in a Y direction, adhesion of the waste ink to the connection terminal 26 can be prevented even if the waste ink drips to the lower end portion 25*k*. Thus, a failure in the recording apparatus 50 due to adhesion of the waste ink to the connection terminal 26 can be reduced.

The user moves the waste ink tank 21 upward (in a +Z direction) from the state illustrated in FIG. 9 to remove the waste ink tank 21, so that the state is shifted to the state illustrated in FIG. 8. Herein, since the shielding unit 25 of the waste ink tank 21 moves downward (in a −Z direction) relative to the container 23 to shield the introduction portions 23*f* and 23*g*, a hand of the user is prevented from adhesion of the waste ink by touching the introduction portions 23*f* and 23*g*.

In the present exemplary embodiment, a plurality of rib portions 23*h* and a plurality of rib portions 25*h* are arranged. However, one rib portion 23*h* and one rib portion 25*h* may be at least arranged. Such arrangement can reduce soiling of the periphery of the waste ink tank 21 with waste ink. However, arrangement of a plurality of rib portions 23*h* and a plurality of rib portions 25*h* as described in the present exemplary embodiment enables more waste ink to be retained and prevented from dripping.

The present exemplary embodiment has been described using a configuration in which both of the container 23 and the shielding unit 25 include rib portions. However, one of the container 23 and the shielding unit 25 may include a rib portion. Even in such a configuration, soiling with waste ink can be reduced as similar to the above.

The shapes of the rib portion 23*h* and the rib portion 25*h* are not limited to the rib shape. Even in a case where each of the rib portions 23*h* and 25*h* is configured to have capillary force, an advantage similar to the aforementioned advantage can be obtained. That is, the rib portions 23*h* and 25*h* can have a shape other than the rib shape as long as the rib portions 23*h* and 25*h* serve as retaining portions having functions of retaining waste ink (liquid) dripping from the introduction portions 23*f* and 23*g*.

Figure 11:
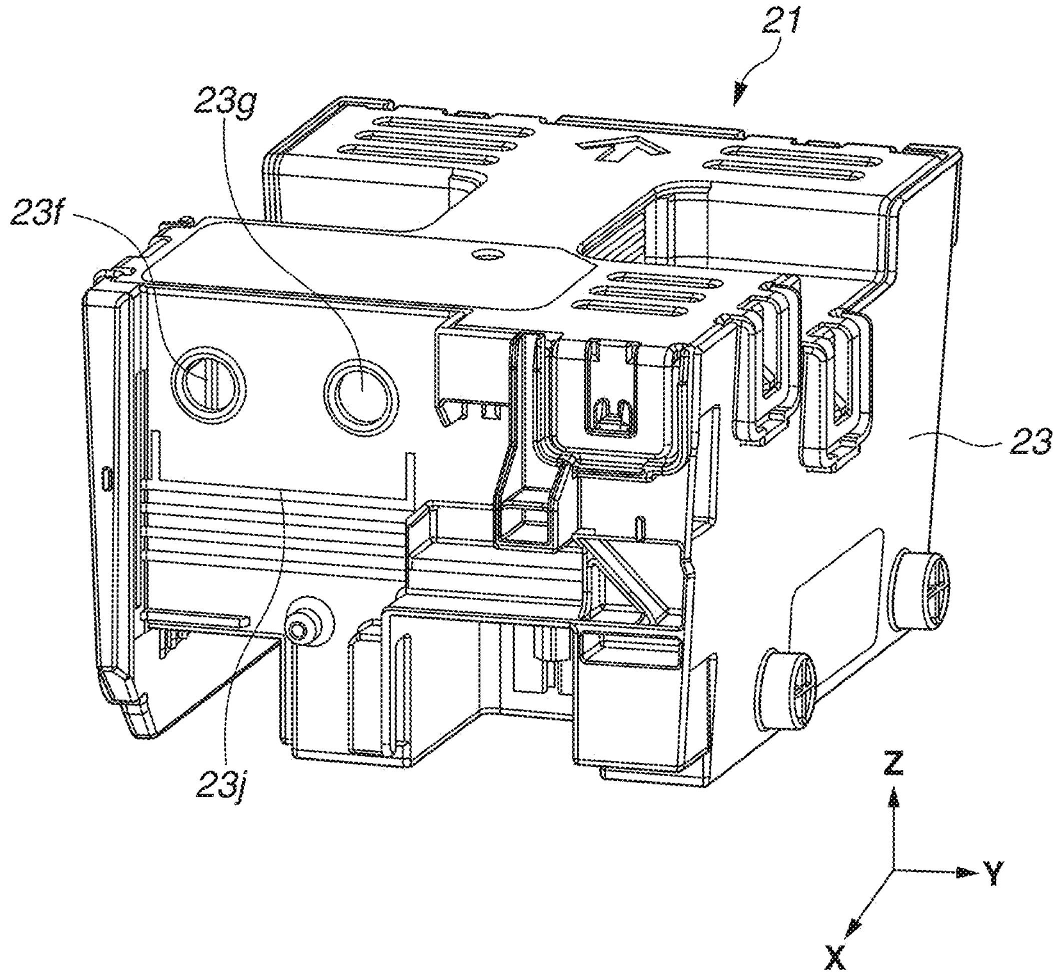
FIG. 11 is a perspective view illustrating a modification example of a waste ink tank of a recording apparatus according to another exemplary embodiment.

FIG. 11 is a perspective view illustrating a modification example of a rib portion of a container 23. The first exemplary embodiment has been described using an example in which the rib portion 23*h* extends in a Y direction. However, as illustrated in FIG. 11, even if a rib portion 23*j* having a U-shape (a box-shape) that is opened in a +Z direction is arranged, an advantage similar to the aforementioned advantage can be obtained.

The first exemplary embodiment has been described using a configuration in which the shielding unit 25 is arranged. However, a configuration in which the shielding unit 25 is not arranged as illustrated in FIG. 11 may be employed. Even with such a configuration, arrangement of a protrusion shape, for example, the rib portion 23*j*, on the container 23 can provide an advantage that soiling caused by waste ink is reduced.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-105355, filed Jun. 27, 2023, which is hereby incorporated by reference herein in its entirety.

What is claimed is:

1. A liquid discharge apparatus comprising:

a suction unit configured to suction liquid from a discharge head configured to discharge liquid; and a tank that includes an introduction portion into which liquid suctioned by the suction unit is introduced, and is detachable from the liquid discharge apparatus, wherein the tank includes a retaining portion configured to retain liquid that has dripped from the introduction portion, wherein the retaining portion has a rib shape protruding from a surface on which the introduction portion is arranged.

2. The liquid discharge apparatus according to claim 1, wherein a plurality of rib shapes including the rib shape is arranged in the tank.

3. The liquid discharge apparatus according to claim 1, wherein the rib shape extends in a direction intersecting with a direction of gravity.

4. The liquid discharge apparatus according to claim 1, wherein the retaining portion is configured to have capillary force.

5. The liquid discharge apparatus according to claim 1, further comprising a shielding unit configured to shield the introduction portion.

6. The liquid discharge apparatus according to claim 5, wherein the shielding unit is disposed on the tank, and wherein the shielding unit causes the introduction portion to be exposed when the tank is attached to the liquid discharge apparatus, and shields the introduction portion when the tank is removed from the liquid discharge apparatus.

7. The liquid discharge apparatus according to claim 6, wherein the shielding unit includes a second retaining portion configured to retain liquid that has dripped from the introduction portion.

8. The liquid discharge apparatus according to claim 7, wherein the second retaining portion is arranged on a surface opposite the introduction portion.

9. The liquid discharge apparatus according to claim 7, wherein the shielding unit has an opening from which the introduction portion is exposed when the tank is attached to the liquid discharge apparatus, and wherein the second retaining portion has a rib shape protruding from a surface on which the opening is arranged.

10. The liquid discharge apparatus according to claim 7, wherein the second retaining portion is configured to have capillary force.

11. A liquid discharge apparatus comprising:

a suction unit configured to suction liquid from a discharge head configured to discharge liquid; and a tank that includes an introduction portion into which liquid suctioned by the suction unit is introduced and a shielding unit configured to shield the introduction portion, and is detachable from the liquid discharge apparatus, wherein the shielding unit includes a retaining portion configured to retain liquid that has dripped from the introduction portion.

12. The liquid discharge apparatus according to claim 11, wherein the shielding unit causes the introduction portion to be exposed when the tank is attached to the liquid discharge apparatus, and shields the introduction portion when the tank is removed from the liquid discharge apparatus.

13. The liquid discharge apparatus according to claim 11, wherein the retaining portion is arranged on a surface opposite the introduction portion.

14. The liquid discharge apparatus according to claim 11, wherein the shielding unit has an opening from which the introduction portion is exposed when the tank is attached to the liquid discharge apparatus, and wherein the retaining portion has a rib shape protruding from a surface on which the opening is arranged.

15. The liquid discharge apparatus according to claim 11, wherein the retaining portion is configured to have capillary force.

* * * * *